United States Patent [19]

Kawamoto et al.

[11] Patent Number: 5,246,981
[45] Date of Patent: Sep. 21, 1993

[54] AQUEOUS EMULSION

[75] Inventors: Seiji Kawamoto, Mobara; Keiichi Kamda, Shimonoseki; Shoji Seki, Mobara, all of Japan

[73] Assignee: Mitsui Toatsu Chemicals, Inc., Tokyo, Japan

[21] Appl. No.: 651,383
[22] PCT Filed: Jul. 9, 1990
[86] PCT No.: PCT/JP90/00878
   § 371 Date: Mar. 6, 1991
   § 102(e) Date: Mar. 6, 1991
[87] PCT Pub. No.: WO91/00873
   PCT Pub. Date: Jan. 24, 1991

[30] Foreign Application Priority Data

Jul. 10, 1989 [JP] Japan .................. 1-175503

[51] Int. Cl.$^5$ .................. C08L 33/26; C08L 33/18; C08L 9/04; C08F 2/16
[52] U.S. Cl. .................. 523/201; 524/458; 524/460; 524/535; 525/902
[58] Field of Search .................. 523/201; 524/458, 460, 524/535; 525/902

[56] References Cited

U.S. PATENT DOCUMENTS

| 3,073,791 | 1/1963 | Barkhutt | 523/201 |
| 3,256,233 | 6/1966 | Hahn et al. | 523/201 |
| 3,265,767 | 8/1966 | Caldwell et al. | 523/201 |
| 3,396,176 | 1/1967 | Fantl | 523/201 |
| 3,403,045 | 9/1968 | Erickson et al. | |
| 3,424,706 | 1/1969 | Smith et al. | 524/535 |
| 3,438,926 | 4/1969 | Burke, Jr. et al. | 524/458 |
| 3,642,680 | 2/1972 | Jennings et al. | 524/460 |
| 3,933,503 | 1/1976 | Schonberg. | |
| 4,504,605 | 3/1985 | Duke et al. | 524/458 |
| 4,855,337 | 8/1989 | Dequatre et al. | 523/201 |
| 4,978,695 | 12/1990 | Hoshino et al. | 523/201 |

FOREIGN PATENT DOCUMENTS

| 1210543 | 8/1986 | Canada. | |
| 112708 | 7/1984 | European Pat. Off.. | |
| 0030474 | 3/1974 | Japan | 524/460 |
| 60-245683 | 12/1985 | Japan. | |
| 63-54035 | 10/1988 | Japan. | |

Primary Examiner—Paul R. Michl
Assistant Examiner—Peter Szekely
Attorney, Agent, or Firm—Burns, Doane, Swecker & Mathis

[57] ABSTRACT

An aqueous emulsion comprising a copolymer having a two-layer structure is produced by polymerizing at least one aqueous vinyl monomer component (II) in the presence of a seed emulsion (I) comprising seeds composed of a copolymer containing 10–50% by weight of (meth-)acrylonitrile as a monomer unit. This aqueous emulsion has heat resistance, solvent resistance, and anti-blocking property, and can be used as an undercoating agent, an agent for treating a back side, a binder for diazo photosensitive paper, a binder for an offset master, and the like.

12 Claims, No Drawings

AQUEOUS EMULSION

BACKGROUND OF THE INVENTION

1. Field of the Invention

The present invention relates to an aqueous emulsion, and more particularly, to an aqueous emulsion composition excellent in at least one of solvent resistance, anti-blocking property and heat resistance.

The aqueous emulsion can be used for applications where a surface coated therewith is required to have at least one of the aforementioned properties, that is, solvent resistance, anti-blocking property, and heat resistance. The aqueous emulsion can be used, for example, as undercoating agents for release paper, back surface treating agents, binders for diazo photosensitive paper, and binders for offset masters.

2. Description of the Related Art

Heretofore, as a component for a releasing agent used for a release paper, silicone dissolved in a solvent has been used. Silicone is so expensive that it is necessary to give a sufficient releasing ability with an amount which is as small as possible.

Therefore, in general, silicone is coated on paper after a filling treatment is effected by means of an undercoating layer so as to prevent silicone from infiltrating into the paper.

As such an undercoating layer, there may be mentioned clay coating, coating with an aqueous high polymer such as polyvinyl alcohol, starch and the like, and laminating with polyethylene (U.S. Pat. No. 3,403,045). Recently, coating with a resin emulsion such as acrylic acid ester copolymer emulsions has been proposed (Japanese patent Application Publication No. Sho 63-54035).

Clay coating is heat resistant, but adhesion with silicone is not good, and aqueous high polymers such as polyvinyl alcohol, starch and the like give a fragile coat film and exhibit poor water resistance so that blocking is liable to occur at a high humidity when it is stored with only an undercoating layer. Further when laminated with polyethylene or the like, the product has a high smoothness and is soft, but the heat resistance is poor.

In addition, resin emulsions are excellent in film shapeability, but are poor in heat resistance and solvent resistance, and do not possess a filling effect. A method has been proposed for improving heat resistance and solvent resistance by forming an admixture with oxidized starch (Japanese Patent Application Laid-open No. Sho 60-245683).

For preparing a carrier for a transferable image, paper is treated with a releasing agent and a binder emulsion composed of an acrylonitrile-butadiene rubber is applied to the releasing agent layer (U.S. Pat. No. 3,933,503).

DESCRIPTION OF THE PREFERRED EMBODIMENTS

As mentioned above, the resin compositions for coating used up to now do not always satisfy all the properties required at present.

An object of the present invention is to provide an aqueous emulsion capable of solving the above-mentioned problems of the prior art and exhibiting excellent solvent resistance, anti-blocking property, heat resistance and the like.

This invention provides a process for producing an aqueous emulsion which comprises polymerizing at least one aqueous vinyl monomer component (II) in the presence of a seed emulsion (I) comprising seeds composed of a copolymer containing 10–50% by weight of (meth)acrylonitrile as a monomer unit to produce a copolymer emulsion having a two-layer structure.

In addition, the present invention provides an aqueous emulsion composition having a two-layer structure produced by polymerizing at least one aqueous vinyl monomer component (II) in the presence of a seed emulsion (I) comprising seeds composed of a copolymer containing 10–50% by weight of (meth)acrylonitrile as a monomer unit.

In addition, the present invention provides undercoating agents for release paper, back surface treating agents, binders for diazo photosensitive paper and binders for offset masters by using the above-mentioned aqueous emulsion composition.

As a seed emulsion (I), a resin emulsion is formed by copolymerization with (meth)acrylonitrile. (Meth)acrylonitrile is contained in the copolymerizable monomer component in an amount of 10–50 wt. %, preferably 20–50 wt. %.

When the content of (meth)acrylonitrile is less than 10 wt. %, the solvent resistance is poor in the form of a coat film, and when the content exceeds 50 wt. %, the polymerization stability is poor.

Free radical polymerizable monomers capable of copolymerizing with (meth)acrylonitrile for polymerizing the seed emulsion include:

acrylic acid esters such as methyl acrylate, ethyl acrylate, propyl acrylate, n-butyl acrylate, i-butyl acrylate, t-butyl acrylate, cyclohexyl acrylate, 2-ethylhexyl acrylate, lauryl acrylate, dodecyl acrylate, stearyl acrylate and the like;

methacrylic acid esters such as methyl methacrylate, ethyl methacrylate, propyl methacrylate, n-butyl methacrylate, i-butyl methacrylate, t-butyl methacrylate, cyclohexyl methacrylate, 2-ethylhexyl methacrylate, lauryl methacrylate, dodecyl methacrylate, stearyl methacrylate and the like; aromatic vinyl compounds such as styrene, α-methylstyrene, vinyltoluene and the like;

ethylenic unsaturated carboxylic acids such as acrylic acid, methacrylic acid, crotonic acid, itaconic acid, maleic acid, fumaric acid and the like;

hydrophilic monomers such as 2-hydroxyethyl acrylate, 2-hydroxyethyl methacrylate, acrylamide, methacrylamide, N-methylol acrylamide, N-methylol methacrylamide, N-butoxymethyl acrylamide, glycidyl acrylate, glycidyl methacrylate and the like;

conjugated diolefins such as butadiene, isoprene, chloroprene and the like;

vinyl acetate, vinyl chloride, vinylidene chloride and the like.

For polymerizing seed emulsions there may be used known methods for emulsion polymerization and there is not any limitation.

Glass transition temperatures of the seed emulsions thus obtained range from −30° C. to 50° C., preferably from −20° C. to 30° C. When the glass transition temperature is lower than −20° C., the film produced by film-shaping is liable to cause blocking. On the contrary, when the glass transition temperature exceeds 50° C., the film-shapeability is lowered and the resulting film is fragile.

What is meant by "an aqueous vinyl monomer component (II) to be polymerized in the presence of a seed emulsion (I)" is a vinyl monomer capable of forming an aqueous polymer by polymerization. For example, as the aqueous vinyl monomer component (II), (meth)acrylamide is used in an amount of 50–100 wt. %, preferably 70–100 wt. %, in the monomer component (II).

When, the amount of (meth)acrylamide used is less than 50 wt. %, sufficient solvent resistance, heat resistance and anti-blocking property can not be obtained, and in addition, sometimes the polymerization does not stably proceed.

In the present invention, other aqueous vinyl monomer components (II) capable of copolymerizing with (meth)acrylamide include, for example, nonionic vinyl type monomers such as diacetone acrylamide, N-methylol acrylamide, N-methylol methacrylamide, vinylpyrrolidone and the like; anionic vinyl type monomers such as acrylic acid, methacrylic acid, itaconic acid, maleic acid, maleic acid ester, fumaric acid and the like; and cationic vinyl type monomers such as dimethylaminoethyl methacrylate, trimethylaminoethyl methacrylate, diethylaminoethyl methacrylate, triethylaminoethyl methacrylate and the like.

These may be used alone or in combination. Other than the above-mentioned monomers, there may be used any vinyl monomer capable of forming aqueous polymers in the present invention.

Upon producing a composition of the present invention by polymerizing the above-mentioned aqueous vinyl monomer used in the present invention in the seed emulsion, a hydrophobic vinyl monomer used for the above-mentioned seed emulsion copolymerizable with an aqueous vinyl monomer can be used for copolymerizing with an aqueous vinyl monomer as far as solvent resistance, anti-blocking property and heat resistance of the film shaped from the resulting composition are not adversely affected. These may be used alone or in combination.

In the present invention, upon producing an aqueous emulsion having a two-layer structure by polymerizing an aqueous vinyl monomer component (II) in the presence of a seed emulsion (I), the solid matter ratio of the seed emulsion (I) to the aqueous vinyl monomer component (II) ranges from 50:50 to 95:5, preferably from 60:40 to 90:10.

When the amount of the aqueous vinyl monomer component (II) exceeds 50 wt. %, water resistance of the resulting film is so poor that blocking is liable to occur at a high humidity. On the contrary, when the amount is less than 5 wt. %, sufficient solvent resistance and heat resistance can not be obtained.

The method of polymerizing an aqueous vinyl monomer component (II) in the presence of a seed emulsion (I) may be effected by separately preparing a seed emulsion (I) and an aqueous vinyl monomer and later mixing the two to effect the polymerization, or manufacturing a seed emulsion, continuously adding an aqueous vinyl monomer and polymerizing.

The aqueous vinyl monomer component may be added at once, continuously, or intermittently dropwise. It is only necessary to select a manner of addition taking into consideration stability of polymerization, control of polymerization heat, and the like, and if so, the properties of the resulting aqueous emulsion are not adversely affected.

As a polymerization initiator, there may be used only a peroxide such as potassium persulfate, ammonium persulfate, hydrogen peroxide and the like to effect free radical polymerization, or a peroxide as mentioned above together with a reducing agent such as sodium hydrogen sulfite, sodium thiosulfate to carry out redox polymerization.

The amount of the free radical initiator is appropriately 0.1–20% by weight based on the aqueous vinyl monomer, preferably 0.1–10% by weight.

The reaction temperature varies depending on the type of the monomer, type of the polymerization initiator, and usually a temperature range of 30°–80° C. is appropriate.

In addition, if necessary, it is possible to add a chain transfer agent.

The particle size in the aqueous emulsion of the present invention is appropriately 0.05–0.6 $\mu$m, preferably 0.1–0.4 $\mu$m.

According to the process of production of the present invention, a stable aqueous emulsion can be produced even if a surface active agent usually used for emulsion polymerization is not employed. Naturally it is permissible to use a surface active agent, if necessary.

As long as the desired effects of the present invention are not disturbed, the following materials may be accordingly added to such aqueous emulsion: aqueous high polymers such as celluloses, starch, polyvinyl alcohol and the like; crosslinking agents such as melamine resin, formaldehyde resin, aqueous epoxy resin and the like; fillers, defoaming agents, wetting agents, leveling agents, film forming auxiliary agents and the like.

The above-mentioned aqueous emulsion composition can give a coat film excellent in solvent resistance, anti-blocking property and heat resistance when said emulsion is directly applied to paper, film, cloth and the like, or said emulsion is mixed with an inorganic pigment such as calcium carbonate, clay, titanium oxide and the like or an organic pigment such as plastic pigment and the like and used as a binder for such pigment and applied to paper and the like.

For example, the aqueous emulsion composition is effectively used for giving a surface which has solvent resistance, anti-blocking property and heat resistance as a result of applying said aqueous emulsion composition thereto. In other words, the composition can be used as an undercoating agent for a release paper, back surface treating agent, binder for diazo photosensitive paper, binder for an offset master etc.

In particular, when a release paper is fabricated, the composition exhibits an excellent filling effect as an undercoating agent for a releasing agent coating liquid for coating with a solvent type releasing agent. Further, the composition is also useful as a back surface treating agent for a release paper where anti-blocking property and heat resistance are required.

When the composition is used as a binder for a diazo photosensitive paper or a binder for an offset master, the composition is highly miscible with inorganic pigments and the like to give a stable pigment coating liquid and when said coating liquid is made into a coat film, the resulting coat film is excellent in solvent resistance.

When the aqueous emulsion composition is applied to a material such as paper, film, cloth and the like. It exhibits excellent solvent resistance, anti-blocking property and heat resistance.

In particular, when the composition is used as an undercoating agent for preparing a release paper, the composition exhibits an excellent filling effect against a releasing agent coating liquid when a solvent type releasing agent is applied to the paper material.

Examples of the present invention are shown below. In the following Examples and Comparison Examples, part or parts are by weight unless otherwise specified.

EXAMPLE 1

In a separable flask equipped with a thermometer, a reflux condenser, a stirrer and a monomer charger were placed deionized water 1110 parts and sodium dodecylbenzenesulfonate 1 part, and the flask was swept with nitrogen gas and heated to 70° C. Potassium persulfate (10 parts) was added, and then 300 parts of acrylonitrile, 680 parts of n-butyl acrylate, and 20 parts of methacrylic acid emulsified with 400 parts of deionized water and one part of sodium dodecylbenzenesulfonate were continuously added dropwise to the flask over 3 hours. Then, the reaction was further carried out at that temperature for 3 hours and the reaction mixture was neutralized with aqueous ammonia to pH 7 to obtain a seed emulsion. To 800 parts of the seed emulsion were added 38 parts of acrylamide, 2 parts of acrylic acid and 20 parts of deionized water and the mixture was heated to 40° C., and further 20 parts of a 10 wt. % aqueous solution of ammonium persulfate and 20 parts of a 10 wt. % aqueous solution of sodium hydrogensulfite were added followed by a polymerization reaction for 1.5 hours. After the polymerization reaction, the reaction mixture was adjusted to pH 7 with aqueous ammonia to produce an aqueous emulsion composition. The evaluation results are shown in Table 2.

EXAMPLE 2

The procedure of Example 1 was repeated except that the composition was as shown in Table 1, and a seed emulsion was obtained.

To 800 parts of this seed emulsion were added 80 parts of methacrylamide and 40 parts of deionized water. The mixture was heated to 40° C., and then 40 parts of a 10 wt. % aqueous solution of ammonium persulfate and 40 parts of a 10 wt. % aqueous solution of sodium hydrogensulfite were added to effect a polymerization reaction for 1.5 hours. Then the reaction mixture was adjusted to pH 7 with aqueous ammonia to obtain an aqueous emulsion composition.

The evaluation results are shown in Table 2.

EXAMPLE 3

The procedure of Example 1 was repeated except that the composition was as shown in Table 1 and a seed emulsion was obtained.

To 450 parts of the seed emulsion were added 114 parts of methacrylamide, 6 parts of acrylic acid and 310 parts of deionized water. The mixture was heated to 40° C., and 60 parts of a 10 wt. % aqueous solution of ammonium persulfate and 60 parts of a 10 wt. % aqueous solution of sodium hydrogensulfite were added to carry out a polymerization reaction for 3 hours. Then, the reaction mixture was adjusted to pH 7 with aqueous ammonia to obtain an aqueous emulsion composition.

The evaluation results are shown in Table 2.

EXAMPLE 4

The procedure of Example 1 was repeated except that the composition was as shown in Table 1, and a seed emulsion was obtained.

To 800 parts of the seed emulsion were added 80 parts of methacrylamide and 40 parts of deionized water. The mixture was heated to 40° C., and 40 parts of a 10 wt. % aqueous solution of ammonium persulfate and 40 parts of a 10 wt. % aqueous solution of sodium hydrogensulfite were added and a polymerization reaction was carried out for 1.5 hours. Then, the reaction mixture was adjusted to pH 7 with aqueous ammonia to obtain an aqueous emulsion composition. The evaluation results are shown in Table 2.

EXAMPLE 5

The procedure of Example 1 was repeated except that the composition was as shown in Table 1 and a seed emulsion was obtained.

To 700 parts of this seed emulsion were added 63 parts of acrylamide, 7 parts of methacrylic acid and 90 parts of deionized water. The mixture was heated to 40° C., and then 70 parts of a 10 wt. % aqueous solution of ammonium persulfate and 70 parts of a 10 wt. % aqueous solution of sodium hydrogensulfite were added thereto followed by a polymerization reaction for 1.5 hours. Then the reaction mixture was adjusted to pH 7 with aqueous ammonia to obtain an aqueous emulsion composition.

The evaluation results are shown in Table 2.

EXAMPLE 6

The procedure of Example 1 was repeated except that the composition was as shown in Table 1 and a seed emulsion was obtained.

To 700 parts of this seed emulsion were added 49 parts of methacrylamide and 21 parts of acrylic acid previously dissolved in 160 parts of deionized water and adjusted to pH 7 with aqueous ammonia. The mixture was heated to 40° C., and then 35 parts of a 10 wt. % aqueous solution of ammonium persulfate and 35 parts of a 10 wt. % aqueous solution of sodium hydrogensulfite were added thereto followed by a polymerization reaction for 1.5 hours. Then the reaction mixture was adjusted to pH 7 with aqueous ammonia to obtain an aqueous emulsion composition.

The evaluation results are shown in Table 2.

EXAMPLE 7

The procedure of Example 1 was repeated except that the composition was as shown in Table 1 and a seed emulsion was obtained.

To 700 parts of this seed emulsion were added 120 parts of methacrylamide and 120 parts of deionized water, and the methacrylamide was dissolved at 40° C. and the mixture was heated to 70° C.

Then 60 parts of a 10 wt. % aqueous solution of ammonium persulfate was added and a polymerization reaction was carried out for 1.5 hours followed by adjusting the pH with aqueous ammonia to 7 to obtain an aqueous emulsion composition. The evaluation results are shown is Table 2.

Comparison Example 1

The procedure of Example 1 was repeated except that the composition was as shown in Table 1 and a seed emulsion was obtained.

To 800 parts of this seed emulsion were added 80 parts of methacrylamide, and 40 parts of deionized water and the mixture was heated to 40° C., and then 40 parts of a 10 wt. % aqueous solution of ammonium persulfate and 40 parts of a 10 wt. % aqueous solution of sodium hydrogensulfite were added thereto followed by a polymerization reaction for 1.5 hours. Then the reaction mixture was adjusted to pH 7 with aqueous ammonia to obtain an aqueous emulsion composition.

The evaluation results are shown in Table 2.

Comparison Example 2

The procedure of Example 1 was repeated except that the composition was as shown in Table 1 and a seed emulsion was obtained.

To 150 parts of this seed emulsion were added 133 parts of acrylamide, 7 parts of acrylic acid and 570 parts of deionized water and the mixture was heated to 40° C., and then 70 parts of a 10 wt. % aqueous solution of ammonium persulfate and 70 parts of a 10 wt. % aqueous solution of sodium hydrogensulfite were added thereto followed by a polymerization reaction for 1.5 hours. Then the reaction mixture was adjusted to pH 7 with aqueous ammonia to obtain an aqueous emulsion composition.

The evaluation results are shown in Table 2.

Comparison Example 3

The procedure of Example 1 was repeated except that the composition was as shown in Table 1 and a seed emulsion was obtained.

To 700 parts of this seed emulsion were added 28 parts of methacrylamide and 42 parts of methacrylic acid previously dissolved in 90 parts of deionized water. The pH of the mixture was adjusted to 7 with aqueous ammonia, and the mixture was heated to 40° C., and then 70 parts of a 10 wt. % aqueous solution of ammonium persulfate and 70 parts of a 10 wt. % aqueous solution of sodium hydrogensulfite were added thereto followed by a polymerization reaction for 1.5 hours. Then the reaction mixture was adjusted to pH 7 with aqueous ammonia to obtain an aqueous emulsion composition.

The evaluation results are shown in Table 2.

Comparison Example 4

The procedure of Example 1 was repeated except that the composition was as shown in Table 1 and a seed emulsion was obtained.

To 800 parts of this seed emulsion were added 80 parts of methacrylamide and 40 parts of deionized water. The mixture was heated to 40° C., and then 40 parts of a 10 wt. % aqueous solution of ammonium persulfate and 40 parts of a 10 wt. % aqueous solution of sodium hydrogensulfite were added thereto followed by a polymerization reaction. However, during the polymerization reaction, aggregate was formed.

Comparison Example 5

For the purpose of comparing with the aqueous emulsion of the present invention, the following seed emulsion was polymerized.

In a separable flask equipped with a thermometer, a reflux condenser, a stirrer and a monomer charger were placed deionized water 1110 parts and sodium dodecylbenzenesulfonate 1 part, and the flask was swept with nitrogen gas and heated to 70° C. Potassium persulfate (10 parts) was added, and then 450 parts of acrylonitrile, 520 parts of n-butyl acrylate, and 30 parts of methacrylic acid emulsified with 400 parts of deionized water and one part of sodium dodecylbenzenesulfonate were continuously added dropwise to the flask over 3 hours. Then, the reaction was further carried out at that temperature for 3 hours and the reaction mixture was neutralized with aqueous ammonia to pH 7 to obtain an aqueous emulsion composition for comparison.

The evaluation results are shown in Table 2.

EVALUATION METHODS

① Solvent Resistance
Evaluation method as to film

An aqueous emulsion produced in each of Examples 1-7 and Comparison Examples 1-3 and 5 is coated on a glass plate by means of bar-coater #60 and dried at 120° C. for 5 min. to form a test film. From the resulting test film a sample piece of 30 mm square is cut out and weighed ($W_o$). This film piece was soaked in toluene for 60 min. and taken out. After the toluene is removed, the film piece is weighed ($W_1$).

The rate of swelling of the film is calculated by the following formula:

$$\text{Rate of Swelling (\%)} = \frac{W_1 - W_o}{W_o} \times 100$$

Evaluation method as to a pigment coating liquid

Each aqueous emulsion composition is mixed with clay (solid matter ratio of aqueous emulsion to clay=50:50) and adjusted to a solid content of 40 wt. % by using deionized water.

The composition thus adjusted is coated on a commercially available high grade paper by means of a bar-coater #20 and dried at 120° C. for one minute to prepare a test paper.

Toluene is coated on the resulting test paper and the state of infiltration of toluene is observed by eye.
○: No infiltration
Δ: Partly infiltrating
X: Much infiltrating ② Anti-blocking Property Each resin is diluted to a solid content of 20%, applied to a commercially available high grade paper by means of bar-coater #20 and dried at 120° C. for 30 sec. to form a test paper. Pieces of 10 cm square are cut away from the resulting test paper, aged at predetermined conditions such as temperature and humidity for about 4 hours, and two pieces are superposed such that the coated surfaces contact each other and loaded with about 30 kg weight for 24 hours. After removing the pieces, the degree of adhesion is measured.
○: No adhesion
Δ: Partly adhering
X: All surfaces adhering ③ Heat Resistance In a manner similar to the anti-blocking test as above, a test paper is prepared, and pieces of 10 cm square each are cut away and superposed such that the coated surfaces contact each other at 120° C. under load of about 30 kg for 24 hours. Then the degree of adhesion is measured.

The results of solvent resistance, anti-blocking property and heat resistance are shown in Table 2.

TABLE 1

| | Example 1 | Example 2 | Example 3 | Example 4 | Example 5 | Example 6 | Example 7 | Comparison Example 1 | Comparison Example 2 |
|---|---|---|---|---|---|---|---|---|---|
| Seed emulsion (I) composition (weight %) | | | | | | | | | |

TABLE 1-continued

| | | | | | | | | | |
|---|---|---|---|---|---|---|---|---|---|
| Acrylonitrile | 30 | 45 | 20 | 30 | | 30 | 25 | 5 | 30 |
| Methacrylonitrile | | | | | 20 | | | | |
| Methyl methacrylate | | | 30 | 30 | 27 | | | 40 | 5 |
| Styrene | | | | | | | 20 | | |
| n-Butyl acrylate | 68 | 52 | 47 | | 47 | 68 | 50 | 52 | 62 |
| 2-Ethylhexyl acrylate | | | | 38 | | | | | |
| Methacrylic acid | 2 | 3 | 3 | 2 | 3 | 2 | 2 | 3 | 3 |
| 2-Hydroxyethyl methacrylate | | | | | 3 | | 3 | | |
| n-Dodecylmercaptane | | | | | 0.1 | | 0.1 | | |
| Solid matter (%) | 40 | 40 | 40 | 40 | 40 | 40 | 40 | 40 | 40 |
| Aqueous emulsion composition (parts) | | | | | | | | | |
| Seed emulsion | 800 (90) | 800 (80) | 450 (60) | 800 (80) | 700 (80) | 700 (80) | 700 (70) | 800 (80) | 150 (30) |
| Acrylamide | 38 (9.5) | | | | 63 (18) | | | | 133 (66.5) |
| Methacrylamide | | 80(20) | 114(38) | 80(20) | | 49(14) | 120(30) | 80(20) | |
| Acrylic acid | 2(0.5) | | 6(2) | | | 21(6) | | | 7(3.5) |
| Methacrylic acid | | | | | 7(2) | | | | |
| Deionized water | 20 | 40 | 310 | 40 | 90 | 160 | 120 | 40 | 570 |
| 10% Ammonium persulfate | 20 | 40 | 60 | 40 | 70 | 35 | 60 | 40 | 70 |
| 10% sodium hydrogensulfite | 20 | 40 | 60 | 40 | 70 | 35 | | 40 | 70 |
| Polymerization stability | ○ | ○ | ○ | ○ | ○ | ○ | ○ | ○ | ○ |
| Solid matter (%) | 40 | 41 | 31 | 41 | 36 | 35 | 41 | 41 | 21 |
| Viscosity (cps/25° C.) | 230 | 170 | 510 | 120 | 210 | 490 | 430 | 140 | 650 |
| Particle size (μm) | 0.23 | 0.25 | 0.33 | 0.18 | 0.23 | 0.27 | 0.21 | 0.20 | 0.25 |

| | Comparison Example 3 | Comparison Example 4 | Comparison Example 5 |
|---|---|---|---|
| Seed emulsion (I) composition (weight %) | | | |
| Acrylonitrile | 30 | 55 | 45 |
| Methacrylonitrile | | | |
| Methyl methacrylate | | | |
| Styrene | | | |
| n-Butyl acrylate | 68 | | 52 |
| 2-Ethylhexyl acrylate | | 39 | |
| Methacrylic acid | 2 | 3 | 3 |
| 2-Hydroxyethyl methacrylate | | 3 | |
| n-Dodecylmercaptane | | 0.1 | |
| Solid matter (%) | 40 | 40 | 40 |
| Aqueous emulsion composition (parts) | | | |
| Seed emulsion | 700 (80) | 800 (80) | Evaluating the seed emulsion alone |
| Acrylamide | | | |
| Methacrylamide | 28(8) | 80(20) | |
| Acrylic acid | | | |
| Methacrylic acid | 42(12) | | |
| Deionized water | 90 | 40 | |
| 10% Ammonium persulfate | 70 | 40 | |
| 10% sodium hydrogensulfite | 70 | 40 | |
| Polymerization stability | Δ | X | |
| Solid matter (%) | 36 | | |
| Viscosity (cps/25° C.) | 560 | | |
| Particle size (μm) | 0.35 | | |

Note)
The numerical value in the parentheses in the aqueous emulsion composition is a solid matter ratio (weight %).

TABLE 2

| Results of Evaluation | Example 1 | Example 2 | Example 3 | Example 4 | Example 5 | Example 6 | Example 7 | Comparison Example 1 | Comparison Example 2 |
|---|---|---|---|---|---|---|---|---|---|
| Solvent resistance | | | | | | | | | |
| Evaluation as to the film (Rate of swelling %) | 31.0 | 4.1 | 21.3 | 16.8 | 25.3 | 29.7 | 14.6 | 145.4 | 13.9 |
| Evaluation as to a pigment coating liquid | ○ | ○ | ○ | ○ | ○ | ○ | ○ | X | ○ |
| Anti-blocking property (Conditions) Temperature (°C.)/ Moisture (RH %) | | | | | | | | | |
| 40/60 | ○ | ○ | ○ | ○ | ○ | ○ | ○ | ○ | Δ |
| 40/75 | ○ | ○ | ○ | ○ | ○ | ○ | ○ | X | X |
| 40/90 | Δ | ○ | ○ | ○ | ○ | Δ | ○ | X | X |
| Heat resistance | ○ | ○ | ○ | ○ | ○ | ○ | ○ | X | Δ |

TABLE 2-continued

|  | Comparison Example 3 | Comparison Example 4 | Comparison Example 5 |
|---|---|---|---|
| Solvent resistance | | | |
| Evaluation as to the film (Rate of swelling %) | 38.2 | | 34.2 |
| Evaluation as to a pigment coating liquid | ○ | | ○ |
| Anti-blocking property (Conditions) Temperature (°C.)/ Moisture (RH %) | | | |
| 40/60 | Δ | | ○ |
| 40/75 | x | | x |
| 40/90 | x | | x |
| Heat resistance | Δ | | x |

What is claimed is:

1. A process for producing an aqueous emulsion which comprises polymerizing at least one aqueous vinyl monomer component (II) containing 50–100% by weight of (meth)acrylamide in the presence of a seed emulsion (I) comprising seeds composed of a copolymer containing 10–50% by weight of (meth)acrylonitrile as a monomer unit to produce a copolymer emulsion having a two-layer structure.

2. The process of claim 1 wherein the seed emulsion (I) and the aqueous vinyl monomer component (II) are in a solid matter ratio of 50:50 to 95:5.

3. The process of claim 1 wherein the seed emulsion (I) and the aqueous vinyl monomer component (II) are in a solid matter ratio of 60:40 to 90:10.

4. An aqueous emulsion composition having a two-layer structure produced by polymerizing at least one aqueous vinyl monomer component (II) containing 50–100% by weight of (meth)acrylamide in the presence of a seed emulsion (I) comprising seeds composed of a copolymer containing 10–50% by weight of (meth)acrylonitrile as a monomer unit.

5. The composition of claim 4 wherein the seed emulsion (I) and the aqueous vinyl monomer component (II) are in a solid matter ratio of 50:50 to 95:5.

6. The composition of claim 4 wherein the seed emulsion (I) and the aqueous vinyl monomer component (II) are in a solid matter ratio of 60:40 to 90:10.

7. A process according to claim 1 in which a free radical polymerizable monomer capable of copolymerizing with (meth)acrylonitrile is a member selected from the group consisting of acrylic acid esters, methacrylic acid esters, aromatic vinyl compounds, ethylenic unsaturated carboxylic acid, hydrophilic monomers, conjugated diolefins, vinyl acetate, vinyl chloride and vinylidene chloride.

8. An aqueous emulsion composition according to claim 4 in which a free radical polymerizable monomer capable of copolymerizing with (meth)acrylonitrile is a member selected from the group consisting of acrylic acid esters, methacrylic acidesters, aromatic vinyl compounds, ethylenic unsaturated carboxylic acid, hydrophilic monomers, conjugated diolefins, vinyl acetate, vinyl chloride and vinylidene chloride.

9. An undercoating agent for a release paper which comprises an aqueous emulsion composition of claim 4.

10. An agent for treating the back side surface of a release paper which comprises an aqueous emulsion composition of claim 4.

11. A binder for a diazo photosensitive paper which comprises an aqueous emulsion composition of claim 4.

12. A binder for an offset master which comprises an aqueous emulsion composition of claim 4.

* * * * *

UNITED STATES PATENT AND TRADEMARK OFFICE
CERTIFICATE OF CORRECTION

PATENT NO. : 5,246,981

DATED : September 21, 1993

INVENTOR(S) : Seiji KAWAMOTO et al

It is certified that error appears in the above-identified patent and that said Letters Patent is hereby corrected as shown below:

Title Page, Item [75], the second-named inventor should be --Kamada--, not "Kamda".

Signed and Sealed this

Twenty-first Day of June, 1994

Attest:

BRUCE LEHMAN

*Attesting Officer*  Commissioner of Patents and Trademarks